C. H. VEEDER.
HUB ODOMETER.
APPLICATION FILED JUNE 22, 1914.

1,125,607.

Patented Jan. 19, 1915.

Attest:
W. J. McGinn
Wallington Campbell

Inventor:
Curtis Hussey Veeder
Redding Greeley + Goodlett
Atty's

UNITED STATES PATENT OFFICE.

CURTIS HUSSEY VEEDER, OF HARTFORD, CONNECTICUT, ASSIGNOR TO THE VEEDER MANUFACTURING COMPANY, OF HARTFORD, CONNECTICUT, A CORPORATION OF CONNECTICUT.

HUB-ODOMETER.

1,125,607.  Specification of Letters Patent.  Patented Jan. 19, 1915.

Application filed June 22, 1914. Serial No. 846,426.

*To all whom it may concern:*

Be it known that I, CURTIS HUSSEY VEEDER, a citizen of the United States, residing in the city of Hartford, in the State of Connecticut, have invented certain new and useful Improvements in Hub-Odometers, of which the following is a specification, reference being had to the accompanying drawings, forming a part hereof.

This invention relates generally to hub odometers and is concerned particularly with the gearing by which the registering mechanism is driven from the driving mechanism which, as usual, is in operative engagement with the vehicle axle.

It will be understood that adequate provision must be made in odometers for changes in the diameter of the wheel to which the odometer is applied so that the registering mechanism will be accurate whether the odometer is secured to one vehicle or another. It has been proposed to change certain of the gears within the odometer casing, when required, to afford compensation for the changes in the diameter of the wheel to which the odometer is applied. A change of the character referred to may not readily be made, however, since the registering mechanism and its chain of gearing is sealed within the odometer casing when the latter is sent out from the factory.

It is the object of the present invention to provide a driving gear between the registering mechanism and the driving mechanism on the axle which is readily accessible at all times and which may be changed according to the diameter of the wheel to which the odometer is applied to insure accurate registration.

The improved gearing may be changed without disturbing the registering mechanism or any of the parts of the driving mechanism.

The invention will be described more particularly with reference to the accompanying drawings in which—

Figure 1:
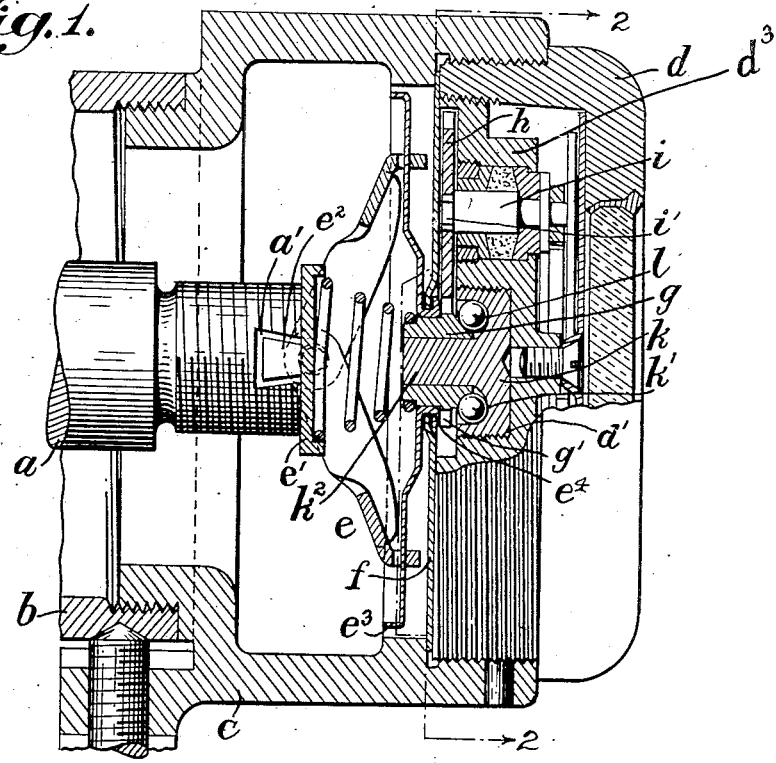
Figure 2:
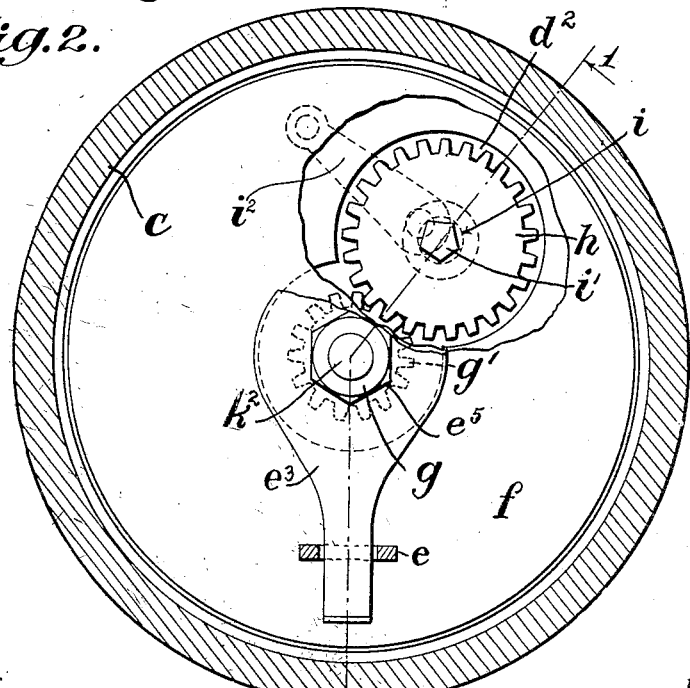

Figure 1 is a view partly in section and partly in elevation showing a hub equipped with the improvements, the section being taken on the planes indicated by the broken line 1—1 of Fig. 2, looking in the direction of the arrows. Fig. 2 is a sectional view, taken on the planes indicated by the broken line 2—2 of Fig. 1 and showing particularly the removable gears mounted in accordance with the invention.

The axle $a$ carries in suitable bearings (not illustrated) the hub $b$ of the wheel, to which is secured in the usual manner the adapter $c$, in the outer end of which is threaded the odometer cap or casing $d$. In the embodiment illustrated, the registering mechanism is adapted to be driven through a flexible driving connection, indicated generally at $e$, and having its inner plate $e'$ engaged with the end of the axle $a$ through a slot $a'$ formed in the end of the axle and a stud $e^2$ carried on the plate $e'$ and resting within said slot. The invention is not concerned with the formation of the driving connection, although it is desirable that some such partition plate, as $f$, be interposed between the driving connection $e$ and the odometer cap $d$, for reasons to be noted.

One member of the driving connection $e$, such as the plate or arm $e^3$, is provided with a polygonal opening substantially concentric with the axle and is flanged around this opening, as at $e^4$, to engage the edges of a central opening formed in the circular partition plate $f$, this opening in the partition $f$, however, being somewhat larger than the diameter of the hub portion of the plate $e^3$ at the point where it is flanged, so that the plate $f$ may rotate freely around said hub portion of the plate $e^3$, as will be the case when the hub $b$ of the wheel rolls about the axle $a$. The opening formed in the member $e^3$ of the driving connection $e$ is polygonal in outline, as indicated at $e^5$ in Fig. 2, and receives therein the correspondingly shaped hub $g$ on which is formed a driving gear $g'$. The gear $g'$ is engaged by a second gear $h$ carried on a driving shaft $i$ of the registering mechanism, the driving shaft being projected beyond the inner face of the cap $d$, as at $i'$, to receive the gear $h$. This extended portion $i'$ is preferably polygonal in outline, as indicated in Fig. 2, and the gear $h$ is provided with an opening of corresponding outline to prevent relative movement between the shaft and the gear, as will be understood. The present invention is not concerned with the actual construction of the registering mechanism nor with the intermediate driving connections between it and the main actuating shaft $i$. As indicated in dotted lines in Fig. 2, the shaft $i$ is connected to an eccentric arm $i^2$ which may impart a step-by-step movement to any well known form of registering mechanism.

While the construction and arrangement thus far described are sufficient for the realization of the advantages to be secured by the present invention, there are certain details of construction which it has been found desirable to embody in the improved odometer and its driving mechanism. For instance, the cap $d$ which is shown as provided with an inner wall $d^3$ is recessed on its inner wall, as at $d'$, to receive in threaded engagement a bearing piece $k$ for the driving gear $g'$, which is grooved, as at $k'$, to form a ball-race for the balls $l$. The hub $g$ has its proximate end grooved similarly to form a ball race against which bear the balls $l$, the result being that relative rotation between the casing $d$ and the gear $g'$ is greatly facilitated. The race member $k$ is provided with a central boss $k^2$ which extends through the hub $g$ and forms an axle and bearing member therefor. The hub is removably mounted on the member $k$.

Another detail of construction which should be noted is the provision of the annular recess $d^2$ in the end wall $d^3$ of the casing $d$, to receive the gear $h$ which transmits movement to the main driving shaft $i$ for the registering mechanism. The recess $d^2$ permits the outer face of the gear $h$ to lie within the face of the rear wall $d^3$ of the casing $d$ and permits the partition plate $f$ to hold the gear $h$ against axial movement along the shaft $i$.

From the description, it will now be understood that the odometer cap $d$ is assembled complete with all of the operating mechanism for the register, as is the driving connection $e$ with the plate $f$. When the odometer is to be applied to the wheel, it is only necessary for the mechanic to determine, as from a chart, the proper ratio between the gears $g'$ and $h$, in view of the diameter of the wheel, to insure accurate registration of the registering mechanism. The gears $g'$ and $h$ may be supplied independently of the odometer itself, and in varying diameters, so that when the proper diameters are determined, it is only necessary to insert the hub $g$ of the gear $g'$ within the polygonal opening in the plate $e^3$, and to slide the gear $h$ into the polygonal portion $i'$ of the shaft $i$, whereupon the odometer cap may be threaded into the adapter $c$ and the latter be secured to the hub $b$. If the odometer is subsequently removed from the wheel and applied to a wheel of different diameter, then the gears $g'$ and $h$ may be changed, in the manner described, for gears of different pitch.

Changes in the details of construction may be made without departing from the spirit of the invention, provided such changes fall within the scope of the appended claims.

I claim as my invention:—

1. In combination with the registering mechanism of a hub odometer and a cap provided with a rear wall forming a chamber in which said mechanism is wholly disposed, an actuating shaft for the mechanism extended through and beyond the rear wall of the cap, a driving connection for the registering mechanism adapted to have operative engagement with the vehicle axle, a gear secured removably on the extended portion of the said actuating shaft, and a coöperating gear in driving engagement with said driving connection but freely slidable axially with respect thereto to permit its removal from the driving connection.

2. In combination with the registering mechanism of a hub odometer and a cap provided with a rear wall forming a chamber in which said mechanism is wholly disposed, an actuating shaft for the mechanism extending through and beyond the rear wall of the cap, the rear wall having a recess therein in which the projecting end of the actuating shaft terminates, a gear mounted on said extended portion of the actuating shaft and in driving engagement therewith but freely slidable axially thereon to permit its removal, a driving connection for the registering mechanism adapted to have operative engagement with the vehicle axle, and a gear in mesh with the first named gear and in driving engagement with said driving connection but freely slidable axially with respect thereto to permit its removal from the driving connection.

3. In combination with the registering mechanism of a hub odometer and a cap provided with a rear wall forming a chamber in which said mechanism is wholly disposed, an actuating shaft for the mechanism extended through and beyond the rear wall of the cap, a driving connection for the registering mechanism adapted to have operative engagement with the vehicle axle, a gear secured removably on the extended portion of the said actuating shaft, a coöperating gear in driving engagement with said driving connection but freely slidable axially with respect thereto to permit its removal from the driving connection, and a plate secured in proximity to the inner wall of the odometer cap and arranged to prevent axial movement of the first named gear along the actuating shaft during use of the odometer but adapted to permit the removal of both of said gears when the odometer cap is removed from the hub.

4. In combination with the registering mechanism of a hub odometer and a cap provided with a rear wall forming a chamber in which said mechanism is wholly disposed, an actuating shaft for the mechanism, a gear carried on said shaft, a driving connection for the registering mechanism adapted to have operative engagement with the vehicle axle and including a coupling member provided with a central aperture of irregular outline, and a driving gear for the first named gear having a hub of irregular outline to correspond with the outline of the aperture, the hub being adapted to rest removably within the said aperture to effect a driving engagement between the coupling member and the second named gear while permitting the second named gear to be slipped readily out of engagement with the driving member.

5. In combination with the registering mechanism of a hub odometer and a cap provided with a rear wall forming a chamber in which said mechanism is wholly disposed, an actuating shaft for the mechanism extended through and beyond the rear wall of the cap, a driving connection for the registering mechanism provided with an irregular central aperture, a gear secured removably on the extended portion of said actuating shaft, a coöperating gear for the first named gear having an irregular hub adapted to rest within and engage the said aperture in the driving connection, said hub being removable from said aperture, a plate carried by said driving connection and serving to limit the movement of said hub and second named gear in one direction, and a ball bearing for the hub removably carried by the inner wall of the odometer cap and serving to limit the movement of the said hub and second named gear in the opposite direction.

This specification signed and witnessed this 19 day of June A. D. 1914.

CURTIS HUSSEY VEEDER.

Signed in the presence of—
E. BARRIE SMITH,
KATHERINE D. KENNEDY.